US011923590B2

(12) United States Patent
Blick et al.

(10) Patent No.: US 11,923,590 B2
(45) Date of Patent: Mar. 5, 2024

(54) MAGNETICALLY TUNABLE RESONATOR

(71) Applicants: Universitaet Hamburg, Hamburg (DE); Wisconsin Alumni Research Foundation, Madison, WI (US)

(72) Inventors: Robert Blick, Hamburg (DE); Max Lagally, Madison, WI (US)

(73) Assignees: Universitaet Hamburg, Hamburg (DE); Wisconsin Alumni Research Foundation, Madison, WI (US)

( * ) Notice: Subject to any disclaimer, the term of this patent is extended or adjusted under 35 U.S.C. 154(b) by 506 days.

(21) Appl. No.: 17/290,137

(22) PCT Filed: Oct. 29, 2019

(86) PCT No.: PCT/EP2019/079573
§ 371 (c)(1),
(2) Date: Apr. 29, 2021

(87) PCT Pub. No.: WO2020/089255
PCT Pub. Date: May 7, 2020

(65) Prior Publication Data

US 2021/0399401 A1 Dec. 23, 2021

Related U.S. Application Data

(60) Provisional application No. 62/752,066, filed on Oct. 29, 2018.

(30) Foreign Application Priority Data

Dec. 14, 2018 (LU) ........................................ 101038

(51) Int. Cl.
*H01P 1/218* (2006.01)
*H01P 7/00* (2006.01)
*H01P 11/00* (2006.01)

(52) U.S. Cl.
CPC ............ *H01P 11/008* (2013.01); *H01P 1/218* (2013.01); *H01P 7/00* (2013.01)

(58) Field of Classification Search
CPC .. H01P 1/218; H01P 1/20; H01P 1/215; H01P 1/217; H01P 7/06; H01P 7/065; H01P 7/00; H01P 11/008; H01P 11/007
See application file for complete search history.

(56) References Cited

U.S. PATENT DOCUMENTS 3,740,675 A 6/1973 Moore et al.
7,573,357 B2 * 8/2009 Hohenester ............. H01P 1/218 333/202

(Continued)

FOREIGN PATENT DOCUMENTS

GB 1268223 A 3/1972

OTHER PUBLICATIONS

International Search Report dated Jan. 16, 2020 in corresponding application PCT/EP2019/079573.

(Continued)

*Primary Examiner* — Stephen E. Jones
(74) *Attorney, Agent, or Firm* — Muncy, Geissler, Olds & Lowe , P.C.

(57) ABSTRACT

Provided is a process for manufacturing magnetically tunable nano-resonators. The nano-resonators comprise nanoparticles of a crystalline magnetic material embedded into cavities of a substrate.

18 Claims, 7 Drawing Sheets

(56) References Cited

U.S. PATENT DOCUMENTS

| | | | |
|---|---|---|---|
| 7,758,919 | B2 | 7/2010 | Ozin et al. |
| 2018/0006603 | A1 | 1/2018 | Parrott et al. |

OTHER PUBLICATIONS

Vasily N. Astratov: "Fundamentals and Applications of Microsphere Resonator Circuits" in: "Springer Series in Optical Sciences", vol. 156, Chapter 17, pp. 423-457, Jan. 1, 2010, Springer Science+ Business Media LLC, XP055611719, DOI: 10.1007/978-1-4419-1744-7_17.

C. E. Fay et al: "Operation of the Ferrite Junction Circulator" IEEE Transactions on Microwave Theory and Techniques, Jan. 1, 1965, pp. 15-27, XP055611759.

* cited by examiner

MAGNETICALLY TUNABLE RESONATOR

This nonprovisional application is a National Stage of International Application No. PCT/EP2019/079573, which was filed on Oct. 29, 2019 which claims priority to Luxembourg Patent Application No. 101038, which was filed in Luxembourg on Dec. 14, 2018 and to U.S. Provisional Application No. 62/752,066, which was filed on Oct. 29, 2018 and which are all herein incorporated by reference.

The invention was made with government support under DE-FG02-03ER46028 awarded by the US Department of Energy. The government has certain rights in the invention.

BACKGROUND OF THE INVENTION

Field of the Invention

The present invention relates to magnetically tunable resonators. As used throughout the specification, the term "magnetically tunable resonator" refers to a resonator where the resonance frequency of the resonator can be adapted (within a given range) by varying a magnetic field applied to one or more components of the resonator.

Description of the Background Art

According to an aspect of the present disclosure, there is provided a process of manufacturing a magnetically tunable nano-resonator. The nano-resonator comprises a nanoparticle of a crystalline magnetic material which is embedded into a cavity of a substrate. During operation, the nanoparticle may perform an oscillatory movement within the cavity, wherein the resonance frequency of the oscillatory movement may be tuned by applying a magnetic field to the nanoparticle

SUMMARY OF THE INVENTION

The nano-resonator may be used to emit electromagnetic waves that have a wavelength which matches the resonance frequency. For example, an alternating electromagnetic field with a spectrum that includes the resonance frequency may be applied to the nanoparticle. The alternating electromagnetic field may be produced by an alternating current flown through wiring formed in the substrate.

The nano-resonator may also be used to receive electromagnetic waves that have a wavelength which matches the resonance frequency. For example, the nanoparticle may be exposed to an alternating electromagnetic field with a spectrum that includes the resonance frequency. The received electromagnetic waves may produce an alternating current flowing through wiring formed in the substrate which may be further processed.

Hence, the nano-resonator may be used within an oscillator, an antenna, a filter (tunable bandpass), a mixer, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

Notably, the drawings are not drawn to scale and unless otherwise indicated, they are merely intended to conceptually illustrate the structures and procedures described herein.

DETAILED DESCRIPTION

Figure 1A:
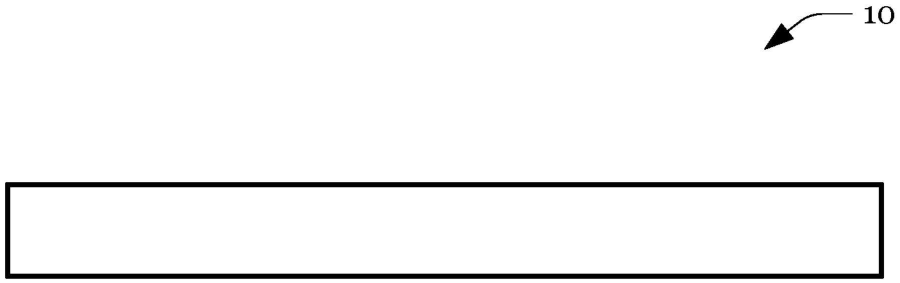
FIG. 1A, FIG. 1B, FIG. 2A, FIG. 2B, FIG. 3A, FIG. 3B, and FIG. 4A to FIG. 4D schematically illustrate a process of manufacturing a magnetically tunable nano-resonator.
Figure 1B:
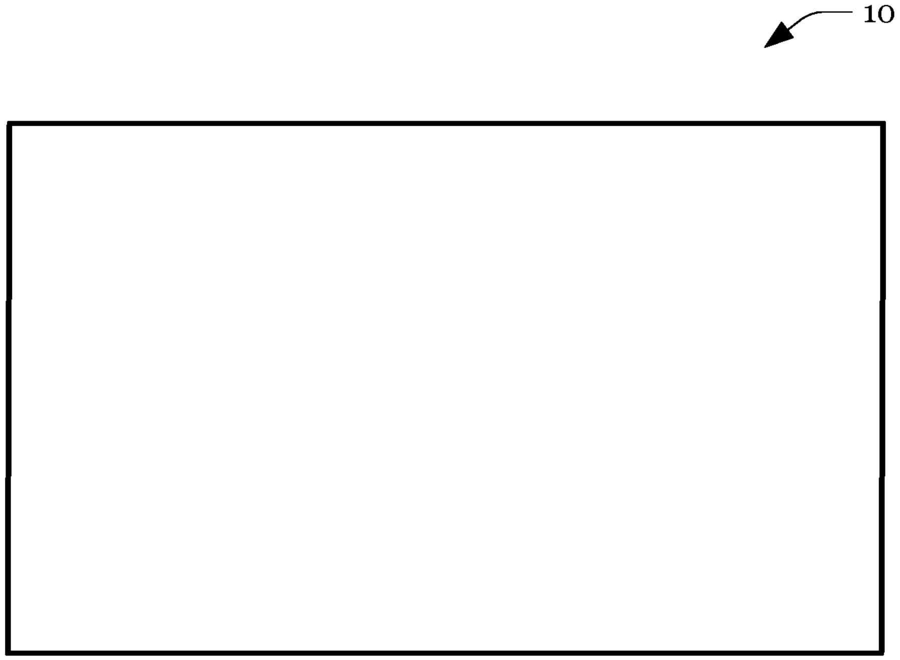

FIG. 1A and FIG. 1*b* show schematic cross-sectional and top views of a nanomembrane 10 (e.g., a silicon membrane with a thickness of about 50 microns or less). During a first processing step, two nanomembranes 10 may be provided with an array of wells 12. For example, the wells 12 may be etched into the nanomembranes 10 by applying a photolithographic process (e.g., dry reactive ion etching, DRIE, and/or nanoimprint lithography, NIL).

Figure 2A:
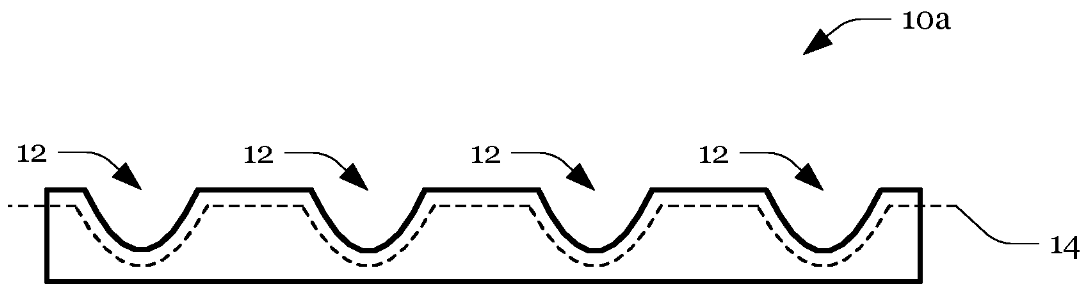
Figure 2B:
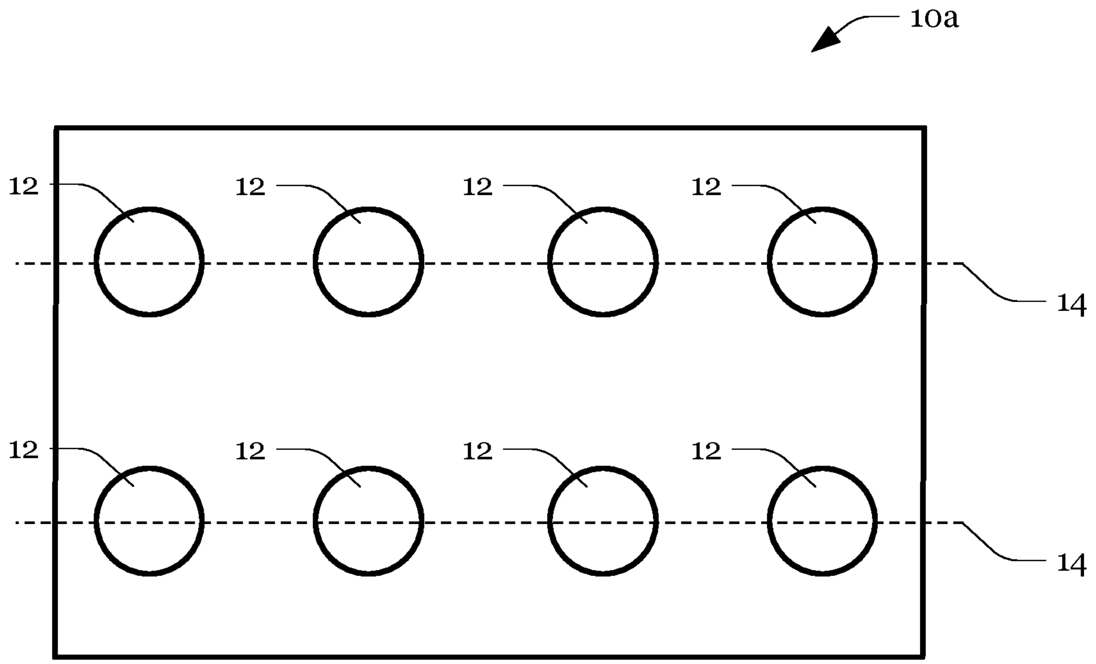
Figure 3A:
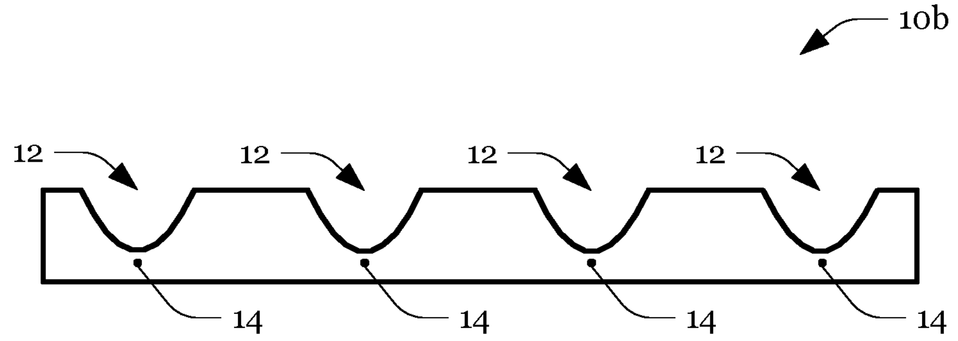
Figure 3B:
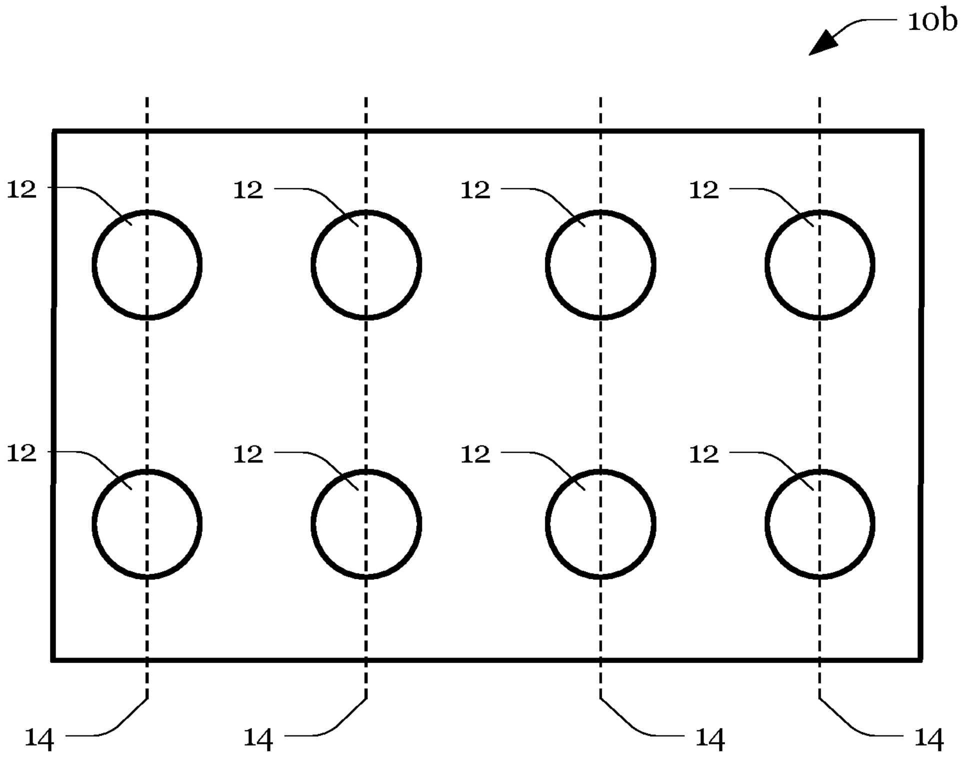

Moreover, electrically conductive traces (wiring) 14 may be added to the layers 10*a*, 10*b* as illustrated in FIG. 2A, FIG. 2B, FIG. 3A, and FIG. 3B. Notably, the wiring 14 (electrodes) of the two layers 10*a*, 10*b* may extend in directions that are perpendicular to each other to avoid (or reduce) cross coupling. Instead of integrating the wiring 14 into the layers 10*a*, 10*b*, the wiring 14 may also be integrated into (additional) adjacent layers on a chip. For example, the nanomembranes 10 may be strain engineered and then transferred on a device-compatible substrate with a patterning according to the device required. Moreover, rather than having an electrode grid (where each electrode extends over a full row/column of wells 12 as shown in FIG. 2B and FIG. 3B), one or more wells 12 in the same row/column may be provided with wiring 14 that can be operated independently from wiring 14 provided to other wells 12 in said row/column.

Figure 4A:
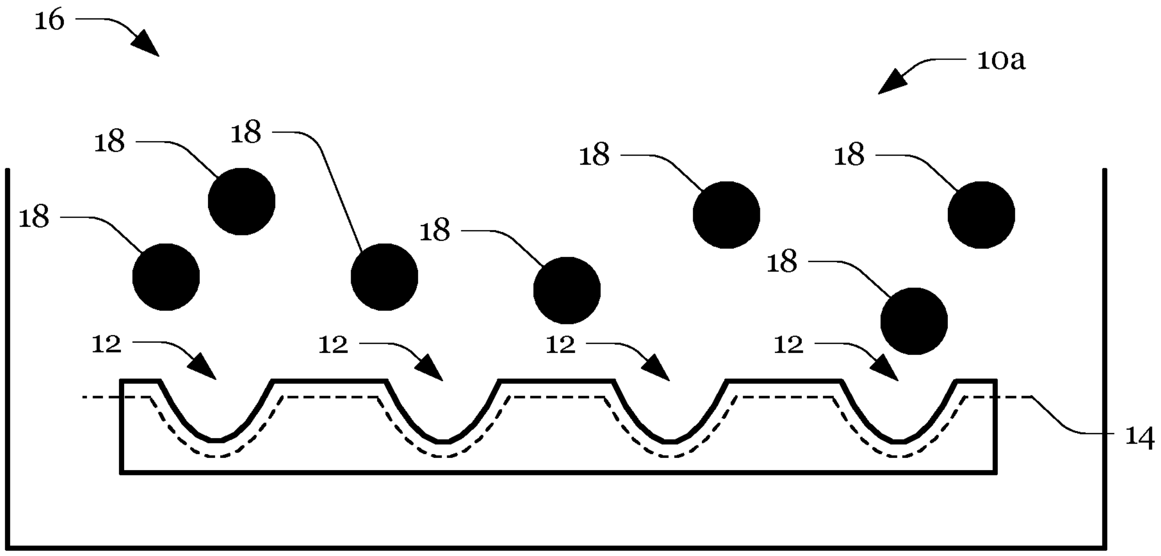

As illustrated in FIG. 4A, one of the layers 10*a* may be rinsed with a colloid including nanoparticles (metallic or semiconducting) with a magnetic moment. Such colloids are commercially available, e.g., from CAN GmbH, Hamburg, Germany. Rinsing may also be performed as batch processing, where multiple chips are rinsed in a single process step.

Figure 4B:
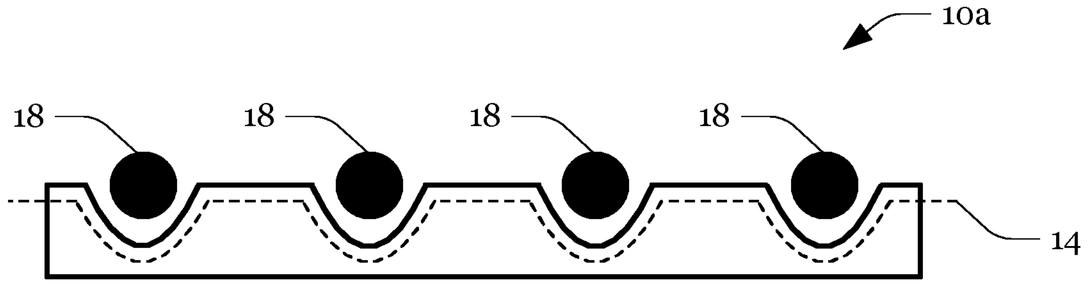
Figure 4C:
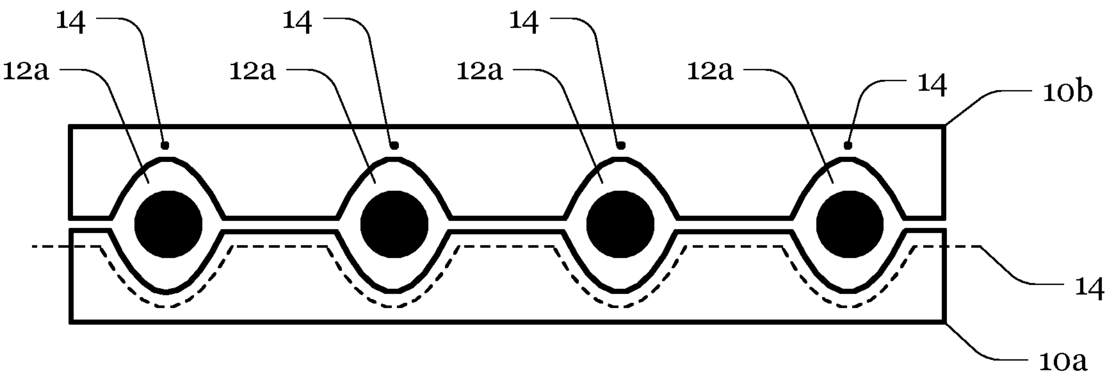
Figure 4D:
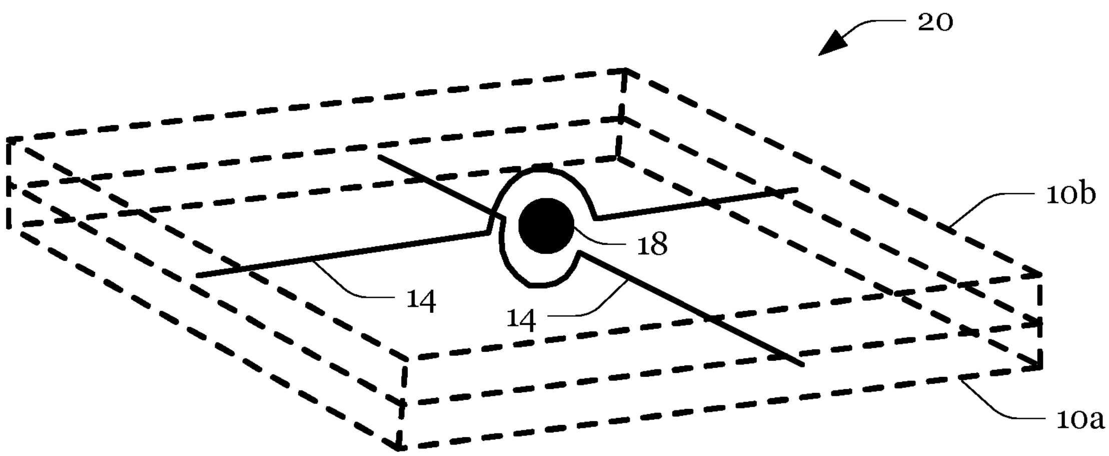
Figure 5:
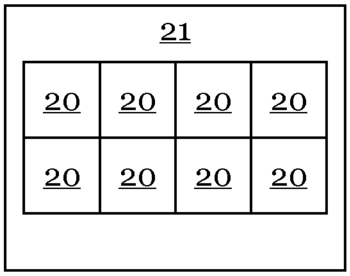
FIG. 5 shows a block diagram of a microwave device in which the nano-resonator may be integrated.
Figure 5A:
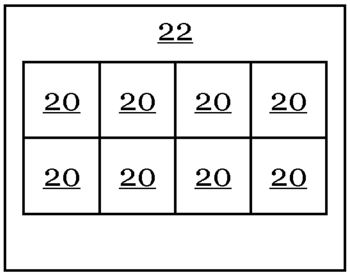
FIG. 5A, FIG. 5B, FIG. 5C, and FIG. 5D show a block diagram of a receiver, an emitter, a filter and a mixer, respectively, in which the nano-resonator may be integrated.
Figure 5B:
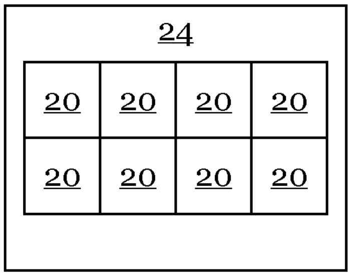
Figure 5C:
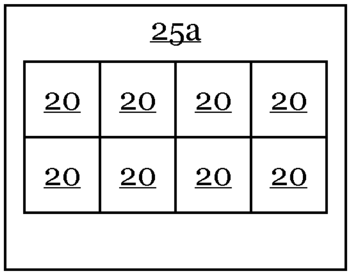
Figure 5D:
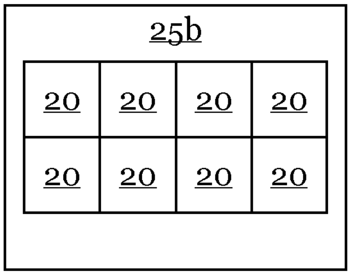

The chips may then be dried such that the magnetic nanoparticles 18 (e.g., spheres made from yttrium-iron-garnet, YIG, or another material) become trapped in the wells 12, as illustrated in FIG. 4B. After drying the chips, the layers 10*a*, 10*b* may be bonded together (e.g., by making use of a wafer-bonder) as illustrated in FIG. 4C, such that the magnetic nanoparticles 18 are arranged in cavities 12*a* formed by matching wells 12. Each cavity 12*a* comprising a magnetic nanoparticle 18 and wiring 14 partially encircling the cavity 12*a* form a nano-resonator 20 as illustrated in FIG. 4D. The wiring 14 may then be contacted on the outskirts of the chips and may be addressed in parallel or separately. The micro/millimeter-wave resonators 20 (or nano-resonators for short) may be integrated into a microwave device 21, as shown in FIG. 5A For example, nano-resonators 20 may be integrated into a receiver 22 or an emitter 24, as schematically illustrated in FIG. 5B and FIG. 5C. Furthermore, nano-resonators 20 may be integrated into a filter 25*a* or a mixer 25*b* as schematically illustrated in FIG. 5D and FIG. 5E.

The above described process allows scaling down existing YIG-microwave sources to the nanoscale, while maintaining their output power density. Furthermore, embedding the nano resonators 20 within nanomembranes 10 allows designing flexible sources/sinks of electromagnetic radiation. This may be particularly advantageous for microwave sources which require focusing the emitted radiation and for all non-planar surfaces, i.e., in sensor, smart phone, and other applications.

Figure 6:
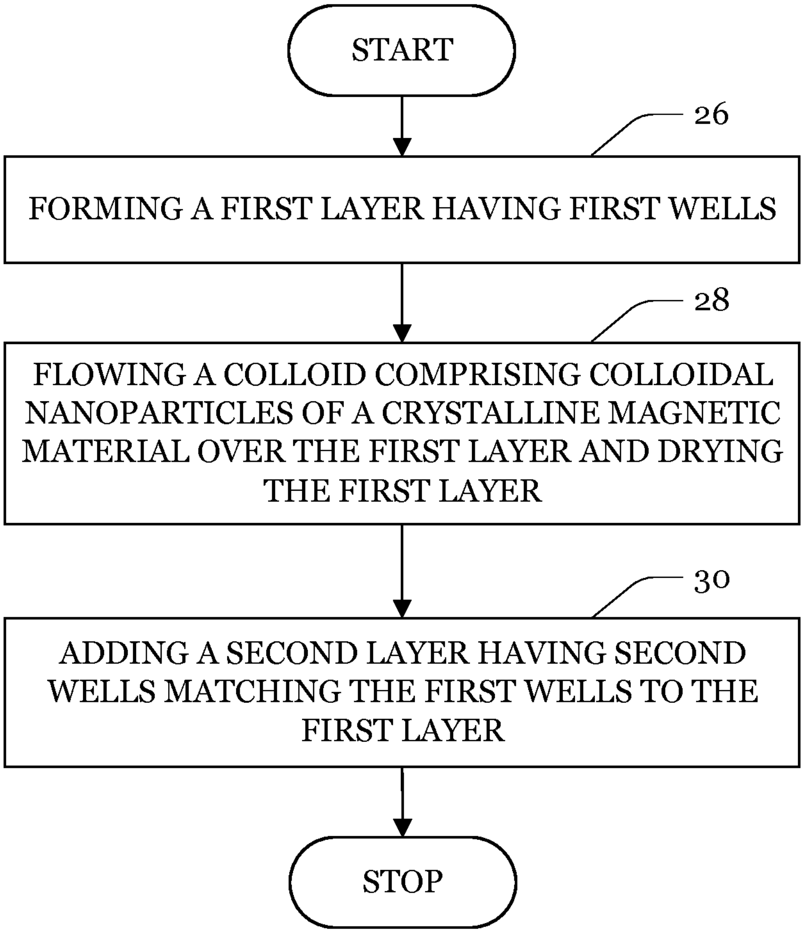
FIG. 6 shows a flow-chart of the process.

A flow-chart of the process is shown in FIG. 6. At step 22, the first layer 14*a* is formed. At step 24, a colloid 16 comprising colloidal nanoparticles 18 of a crystalline magnetic material are flown over the first layer 14*a* and the first layer 14*a* is dried such that the nanoparticles 18 become trapped in the wells 12. At step 26, the second layer 14*b* is added to the first layer 14*a*, such that the nanoparticles 18 are arranged in cavities of the flexible sheet formed by the layers 14*a*, 14*b*.

Figure 7:
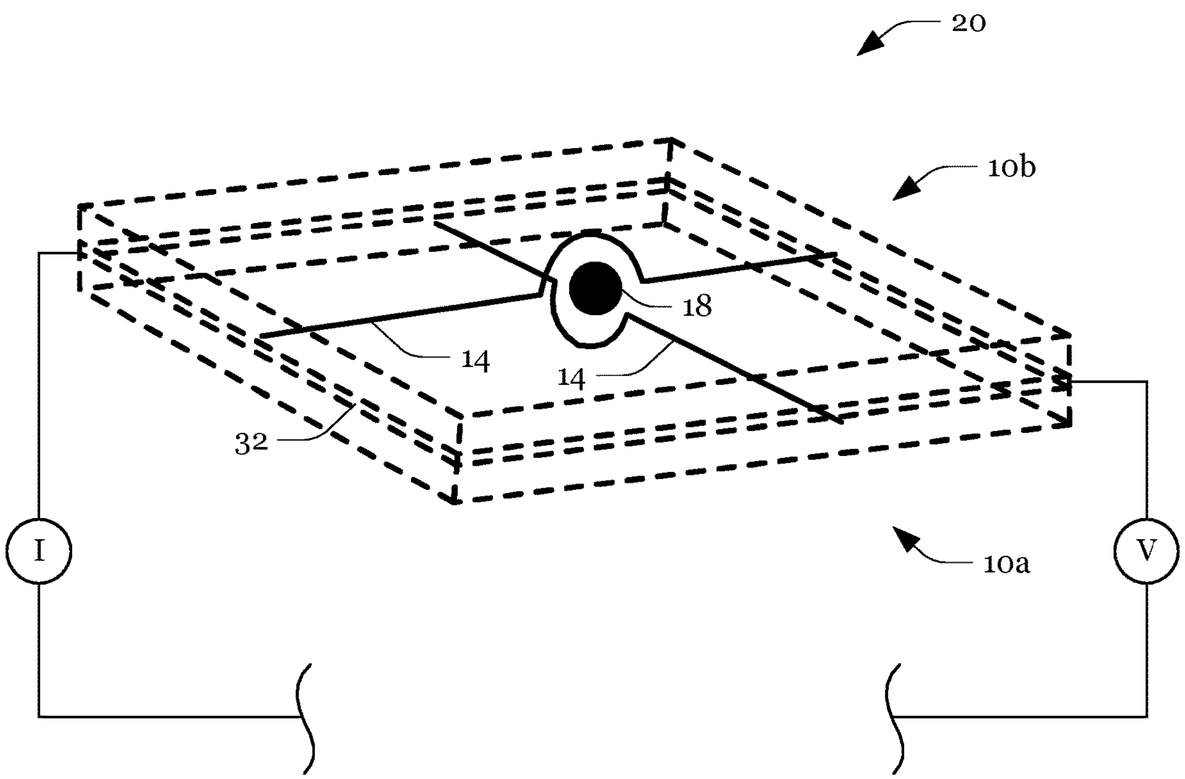
FIG. 7 illustrates a modification of the microwave device of FIG. 5.

As schematically illustrated in FIG. 7, a nano-resonator 20 may be provided with a graphene layer 32 (e.g., a mono- or bilayer). The graphene layer 32 may be part of one of the nanomembrane layers 10*a*, 10*b*. Moreover, a voltage applied to the graphene layer 32 may be measured and/or controlled. Likewise, a current through the graphene layer 32 may be measured and/or controlled.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A microwave device, comprising:
a plurality of magnetically tunable nano-resonators, wherein the nano-resonators comprise nanoparticles of a crystalline magnetic material embedded into cavities of a flexible sheet.

2. The microwave device of claim 1,
wherein the nanoparticles are spheres of yttrium-iron-garnet.

3. The microwave device of claim 1, wherein the flexible sheet comprises a first layer bonded to a second layer, both layers being made from flexible semiconductor nanomembranes.

4. The microwave device of claim 3,
wherein both layers comprise electrodes and each of said cavities is at least partially encircled by two electrodes which extend into directions that are perpendicular to each other.

5. The microwave device of claim 1,
wherein the cavities form a cavity array.

6. The microwave device of claim 1, wherein different nano-resonators are independently tunable.

7. The microwave device of claim 1,
wherein the microwave device is a device selected from a group consisting of a microwave receiver, a microwave emitter, a microwave filter, and a microwave mixer.

8. The microwave device of claim 1,
wherein the first layer or the second layer comprises a graphene layer.

9. A method of manufacturing a magnetically tunable resonator, the method comprising:
forming a first layer having first wells;
flowing a colloid comprising colloidal nanoparticles of a crystalline magnetic material over the first layer;
drying the first layer; and
adding a second layer having second wells matching the first wells to the first layer.

10. The method of manufacturing a magnetically tunable resonator of claim 9, wherein the nanoparticles are spheres of yttrium-iron-garnet.

11. The method of manufacturing a magnetically tunable resonator of claim 9, further comprising:
manufacturing the first layer and the second layer from flexible nanomembranes.

12. The method of manufacturing a magnetically tunable resonator of claim 9, wherein the first layer and the second layer comprise a semiconductor material.

13. The method of manufacturing a magnetically tunable resonator of claim 9, further comprising:
forming the wells by applying a photolithographic process to the first and second layer.

14. The method of manufacturing a magnetically tunable resonator of claim 9, wherein the matching first and second wells form cavities.

15. The method of manufacturing a magnetically tunable resonator of claim 6, wherein the cavities form a cavity array.

16. The method of manufacturing a magnetically tunable resonator of claim 9, wherein at least one of the first and the second layer comprises electrically conductive material.

17. The method of manufacturing a magnetically tunable resonator of claim 9, wherein a cavity formed by two matching wells comprises a nanoparticle of a crystalline magnetic material, and a resonance frequency of the nanoparticle oscillating within the cavity is tunable by flowing an electrical current through an electrically conductive material that at least partially encircles the cavity.

18. The method of manufacturing a magnetically tunable resonator of claim 17, wherein the resonance frequency is tunable to frequencies above 1 Terahertz.

* * * * *